(12) United States Patent
Kim

(10) Patent No.: US 8,259,194 B2
(45) Date of Patent: Sep. 4, 2012

(54) PHOTOGRAPHING APPARATUS HAVING FUNCTIONS OF PORTABLE MULTIMEDIA PLAYER

(75) Inventor: Seong-hyun Kim, Suwon-si (KR)

(73) Assignee: SAMSUNG Electroncis Co., Ltd., Suwon-si (KR)

( * ) Notice: Subject to any disclaimer, the term of this patent is extended or adjusted under 35 U.S.C. 154(b) by 473 days.

(21) Appl. No.: 11/935,699

(22) Filed: Nov. 6, 2007

(65) Prior Publication Data

US 2008/0303921 A1 Dec. 11, 2008

(30) Foreign Application Priority Data

Jun. 11, 2007 (KR) .................. 10-2007-0056651

(51) Int. Cl.
*H04N 5/76* (2006.01)
*H04N 5/225* (2006.01)
(52) U.S. Cl. ................. 348/231.7; 348/333.07
(58) Field of Classification Search ............ 348/75, 348/220.1, 222.1, 333.01, 333.07, 375
See application file for complete search history.

(56) References Cited

U.S. PATENT DOCUMENTS

| | | | | |
|---|---|---|---|---|
| 5,844,604 A * | 12/1998 | Myeong | ................. | 348/373 |
| 6,873,356 B1 * | 3/2005 | Kanbe et al. | ................. | 348/207.1 |
| 7,009,637 B2 * | 3/2006 | Sawachi | ................. | 348/211.99 |
| 7,126,816 B2 * | 10/2006 | Krah | ................. | 361/679.55 |
| 7,140,034 B2 | 11/2006 | Kamei et al. | | |
| 2005/0012850 A1 * | 1/2005 | Wang | ................. | 348/372 |
| 2005/0012852 A1 * | 1/2005 | Gann et al. | ................. | 348/373 |
| 2005/0193017 A1 * | 9/2005 | Kim | ................. | 707/104.1 |
| 2005/0275729 A1 * | 12/2005 | Billerbeck | ................. | 348/222.1 |
| 2006/0023069 A1 * | 2/2006 | Saito | ................. | 348/207.99 |

FOREIGN PATENT DOCUMENTS

| | | |
|---|---|---|
| JP | 2001-028740 | 1/2001 |
| JP | 2003-101929 | 4/2003 |
| JP | 2006-157349 | 6/2006 |

* cited by examiner

*Primary Examiner* — Trung Diep
(74) *Attorney, Agent, or Firm* — Stanzione & Kim, LLP

(57) ABSTRACT

A photographing apparatus having portable multimedia player (PMP) functions. The photographing apparatus provides the PMP functions to store multimedia content such as images, music and moving image files and to play back the stored multimedia content using recording and playback functions of the photographing apparatus so that portability can be improved and a user can enjoy the multimedia content. Specifically, the photographing apparatus includes a photographing module to provide a photographing function and a PMP module to record and play back the photographed image and to provide the PMP function. Therefore, if a display unit is part of the PMP module and the PMP module is attached to the photographing apparatus, the display unit may be used as a part of the photographing apparatus, and if the display unit is separated from the photographing apparatus, the display unit may be used as a PMP.

22 Claims, 2 Drawing Sheets

PHOTOGRAPHING APPARATUS HAVING FUNCTIONS OF PORTABLE MULTIMEDIA PLAYER

CROSS-REFERENCE TO RELATED APPLICATION

This application claims the benefit of Korean Application No. 2007-56651, filed Jun. 11, 2007 in the Korean Intellectual Property Office, the disclosure of which is incorporated herein by reference.

BACKGROUND OF THE INVENTION

1. Field of the Invention

Aspects of the present invention relate to a photographing apparatus having functions of a portable multimedia player, and more particularly, to a photographing apparatus having functions of a portable multimedia player in which data of various compression formats can be decoded, while an image is being photographed, recorded and displayed.

2. Description of the Related Art

Photographing apparatuses photograph objects and process image signals and audio signals generated, so that the processed signals may be recorded on recording media and later played back. Photographing apparatuses may photograph not only still images but also moving images captured over a long period of time. Examples of such photographing apparatuses include camcorders, digital cameras and mobile phones and portable communication terminals with digital camera functions.

FIG. 1 is a block diagram of a conventional photographing apparatus. As shown in FIG. 1, the conventional photographing apparatus 100 includes a capturing unit 110, a controller 120, an image processor 130, a display unit 140, a storage unit 150, a coder/decoder (codec) 160 and a power supply unit 170.

The capturing unit 110 captures an image, and converts an optical signal representing the image entered through a lens (not shown) into an image signal. The capturing unit 110 also removes noise components from the image signal, adjusts the gain level of the image signal, and converts the processed image signal into a digital signal.

The image processor 130 performs signal processing, such as gain level control, aperture compensation and automatic white balancing (AWB), with respect to the image signal transferred from the capturing unit 110. For example, the image processor 130 converts the processed image signal into a suitable format compliance with the ITU-656 standard and then transmits the converted signal to the display unit 140 and the codec 160, under the control of the controller 120.

If the photographed image is a still image, the image processor 130 may compress the image signal corresponding to the still image and store the compressed signal in the storage unit 150. If the photographed image is a moving image, the image processor 130 may process the image signal corresponding to the moving image and may output the processed signal to the codec 160.

The codec 160 compresses the image signal output from the image processor 130, and stores the compressed signal in the storage unit 150. Additionally, the codec 160 decodes the image signal stored in the storage unit 150 and displays the moving image on the display unit 140.

Recently, multifunctional apparatuses that provide a variety of functions in a single device in order to improve efficiency and provide user convenience have become widespread. Photographing apparatuses may also be incorporated into multifunctional apparatuses, in which a camera for photographing an image and a recorder for recording and playing back the photographed image are combined in a single device.

Accordingly, there is a need for a photographing apparatus capable of providing portable multimedia player (PMP) functions that include storage of multimedia content such as images, music and moving image files, and also play back the stored multimedia content using recording and playback functions of the photographing apparatus, so that portability can be improved and a user can enjoy the multimedia content.

SUMMARY OF THE INVENTION

Aspects of the present invention relate to a photographing apparatus having functions of a portable multimedia player, in which the functions of the portable multimedia player (PMP) may be used together with photographing functions or other functions of a conventional photographing apparatus.

Aspects of the present invention relate to a photographing apparatus having functions of a PMP, which can be easily carried even when the functions of the PMP are added.

In accordance with an exemplary embodiment of the present invention, a photographing apparatus comprises a photographing module to photograph an image and a multimedia module that is detachably mounted with the photographing module, to record and play back the image photographed by the photographing module and to store and play back multimedia content input from an external device. The detachable multimedia module may be portable. The multimedia module may be connected to a display unit of the photographing module.

According to an aspect of the present invention, the photographing module may include a capturing unit to convert an optical signal entered through a lens into an image signal; an image processor to compress the image signal transferred from the capturing unit, and to transmit the image signal to the multimedia module if the image signal is a moving image; a memory to store the image signal compressed by the image processor; a main controller to transmit a recording command and a playback command of the image; and a main power supply unit to supply a power source to the photographing module.

According to an aspect of the present invention, the multimedia module may include a storage unit to store an image signal corresponding to the moving image transmitted from the image processor and to store multimedia content; a display to display the image corresponding either to the image signal transmitted from the image processor or to the stored image signal and multimedia content; a signal processor to compress the image signal transmitted from the image processor to record the compressed signal in the storage unit and to decode the stored image signal or multimedia content to output the selected image or content to the display; a controller to control the signal processor according to the recording command and playback command transmitted from the main controller; and a sub-power supply unit to supply the power source to the multimedia module.

According to an aspect of the present invention, the image signal transmitted from the image processor may be transmitted to the signal processor according to the ITU-656 standard. The main controller may communicate with the controller using a serial peripheral interface (SPI).

According to an aspect of the present invention, the multimedia module may be a module to provide portable multimedia player (PMP) functions to record and play back multimedia content. When the multimedia module is combined with the photographing module, the multimedia module may provide functions to record and play back the photographed image. When the multimedia module is separated from the photographing module, the multimedia module may provide the PMP functions.

According to an aspect of the present invention, the storage unit, the display unit and the signal processor of the multimedia module may be shared with the photographing module to record and play back the photographed image when the multimedia module is combined with the photographing module.

Additional aspects and/or advantages of the invention will be set forth in part in the description which follows and, in part, will be obvious from the description, or may be learned by practice of the invention.

BRIEF DESCRIPTION OF THE DRAWINGS

These and/or other aspects and advantages of the invention will become apparent and more readily appreciated from the following description of the embodiments, taken in conjunction with the accompanying drawings of which.

DETAILED DESCRIPTION OF THE EMBODIMENTS

Figure 1:
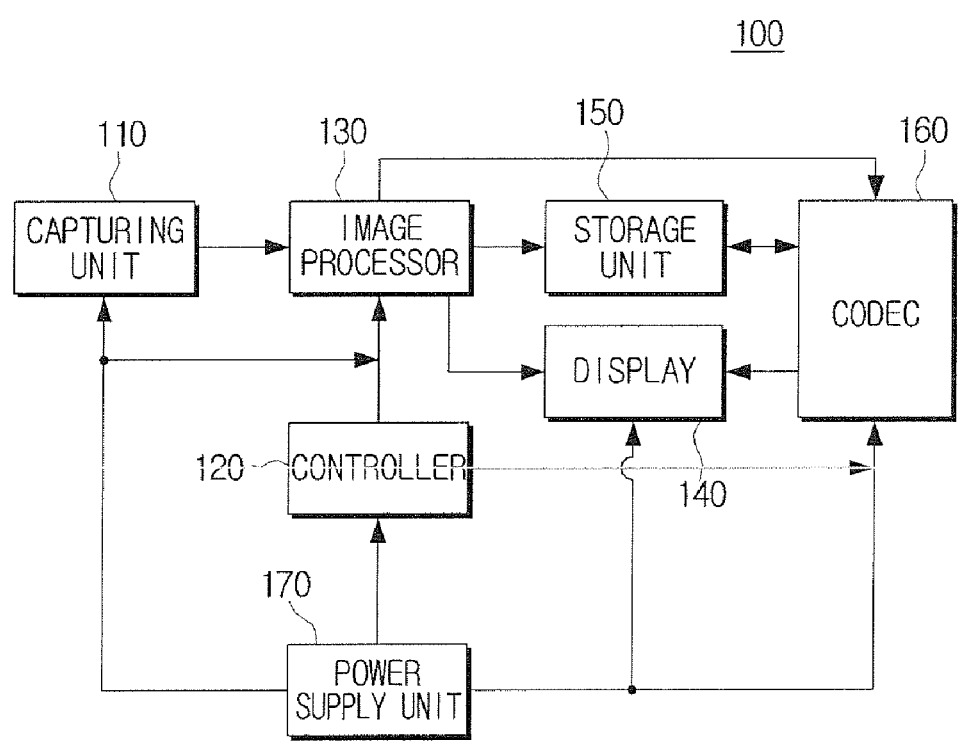
FIG. 1 is a block diagram of a conventional photographing apparatus.

Reference will now be made in detail to an example embodiment of the present invention, the example of which is illustrated in the accompanying FIG. 2, wherein like reference numerals refer to like elements throughout. The example embodiments are described below in order to explain the present invention by referring to the figures.

Figure 2:
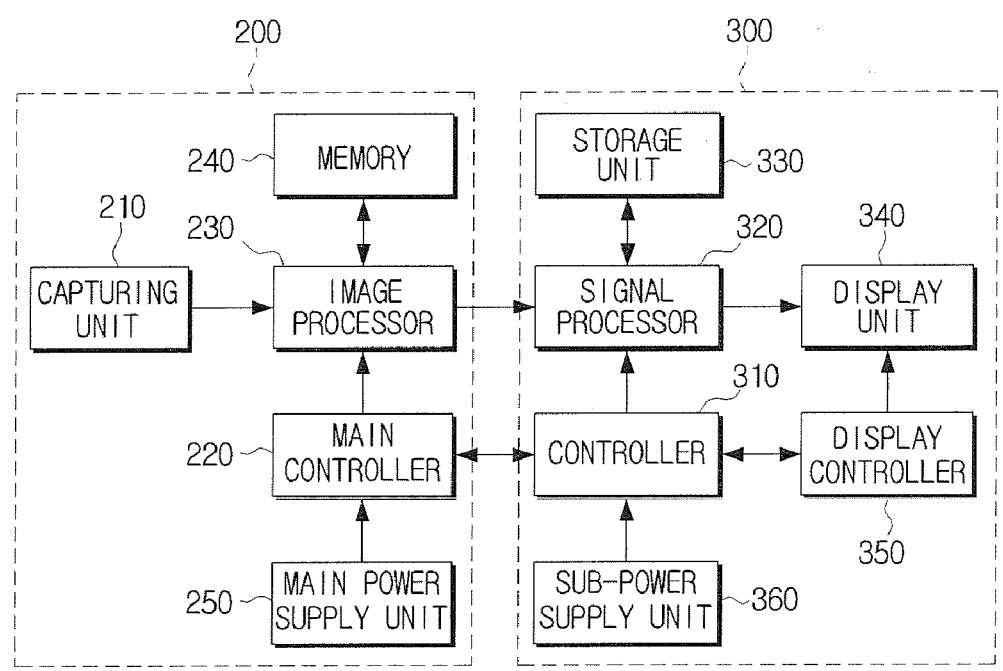
FIG. 2 is a block diagram of a photographing apparatus having portable multimedia player (PMP) functions according to an example embodiment of the present invention.

FIG. 2 is a block diagram of a photographing apparatus having portable multimedia player (PMP) functions according to an example embodiment of the present invention. The photographing apparatus according to this example embodiment of the present invention provides PMP functions that include storage of multimedia content such as images, music and moving image files as well as play back of the stored multimedia content using recording and playback functions of the photographing apparatus, so that portability can be improved and a user can enjoy the multimedia content. One or more selected photographing functions may be separated from the PMP functions in order to increase portability.

Referring to FIG. 2, the photographing apparatus includes a photographing module 200 to provide the photographing functions and a PMP module 300 to provide the PMP functions. The PMP module 300 is incorporated into the photographing apparatus, and may be attached to or detachable from the photographing apparatus.

Specifically, the photographing module 200 that provides functions such as photographing images includes a capturing unit 210, a main controller 220, an image processor 230, a memory 240 and a main power supply unit 250.

The PMP module 300 for recording and playing back the photographed image and providing the PMP functions is detachably mounted with the photographing module 200. The PMP module 300 includes a controller 310, a signal processor 320, a storage unit 330, a display unit 340, a display controller 350 and a sub-power supply unit 360.

The capturing unit 210 converts an optical signal entered through a lens (not shown) into an image signal. The capturing unit 210 also removes noise components from the image signal, adjusts the gain level of the image signal, and converts the processed image signal into a digital signal.

The main controller 220 controls the operation of the photographing module 200. Specifically, the image processor 230 performs signal processing, such as gain level control, aperture compensation and automatic white balancing (AWB), with respect to the image signal transferred from the capturing unit 210 under the control of the main controller 220.

If the image transferred from the capturing unit 210 is a still image, the image processor 230 may compress the image signal corresponding to the still image using a Joint Photographic Experts Group (JPEG) technique and store the compressed signal in the memory 240. Here, the memory 240 may be a NAND flash memory having a small capacity.

The image processor 230 converts the processed image signal into a suitable format such as a 656 format in compliance with the ITU-656 standard and transmits the converted signal to the signal processor 320 of the PMP module 300 so that the image can be displayed under the control of the main controller 220. In this situation, the image signal converted into the 656 format may be transmitted according to the ITU-656 standard.

The main controller 220 transmits a display command to the controller 310 of the PMP module 300 while the image signal is being transmitted. The main controller 220 of the photographing module 200 communicates with the controller 310 of the PMP module 300 using a serial peripheral interface (SPI).

If the image transferred from the capturing unit 210 is a moving image, the image processor 230 may convert the processed image signal into the 656 format and may transmit the converted signal to the signal processor 320 of the PMP module 300 under the control of the main controller 220, and at the same time, the main controller 220 may transmit a recording command and a display command to the controller 310 of the PMP module 300.

The main power supply unit 250 supplies power to the photographing module 200.

If the image signal converted into the 656 format and the display command are transmitted respectively from the image processor 230 and the main controller 220 of the photographing module 200, the controller 310 may control the signal processor 320 to display an image corresponding to the transmitted image signal. The signal processor 320 may adjust the size of the image signal so that the size of the image signal matches the size of the display unit 340, and may then output the image signal to the display unit 340.

If the image signal corresponding to the moving image, and the recording and display commands are transmitted respectively from the image processor 230 and the main controller 220 of the photographing module 200, the controller 310 may control the signal processor 320 to compress the transmitted image signal and store the compressed signal in the storage unit 330. In this situation, the signal processor 320 may compress the image signal corresponding to the moving image using a Moving Picture Experts Group (MPEG) technique and store the compressed signal in the storage unit 330. Here, the storage unit 330 may be a NAND flash memory having a large capacity. In other words, the still image may be stored in the memory 240 of the photographing module 200, and the moving image may be stored in the storage unit 330 of the PMP module 300 which has a large capacity for storing multimedia content.

The signal processor 320 may perform recording and simultaneously adjust the size of the image signal so that the size of the image signal matches the size of the display unit 340 to output the image signal to the display unit 340. Additionally, the signal processor 320 generates a graphical user interface (GUI) screen related to the photographing functions and PMP functions, and outputs the generated GUI screen to the display unit 340.

The display unit 340 is implemented as a touch screen, and comprises an organic light-emitting diode (OLED). OLEDs are thin film light emitting diodes (LEDs) whose emissive layers comprise organic compounds. OLEDs have the characteristics of self-emission, so OLEDs display better than liquid crystal displays (LCDs) and do not require a backlight. Additionally, OLEDs have a quicker response rate relative to LCDs, and are thin and light-weight.

The display controller 350 transfers an input provided by touching the touch screen to the controller 310, and controls the OLED of the display unit 340 to display the image and GUI screen. The sub-power supply unit 360 supplies power to the PMP module 300. The PMP module 300 provides a universal serial bus (USB) interface (not shown), and thus the photographed image can be output to a television (TV) or a computer.

The situation in which the PMP module 300 is attached to the photographing module 200 to record and play back the photographed image was cited above. As cited above, in order to fully use the photographing apparatus, the PMP module 300 should be attached to the photographing module 200 of the photographing apparatus because the multimedia recording and playback functions of the PMP module 300 are similar to moving image recording and playback functions of the photographing apparatus. Additionally, the storage unit 330 or the display unit 340 may be shared in common.

If the PMP module 300 is separate from the photographing apparatus, it still may be used as a PMP. In this situation, the signal processor 320 may store the multimedia content such as images, music and moving image files that are input from outside the photographing apparatus in the storage unit 330, and may play back and output the stored multimedia content. This is because the signal processor 320 may support an H.264 compression technique in addition to the JPEG and MPEG techniques.

Accordingly, if the PMP module 300 is attached to the photographing apparatus, all functions, including PMP functions, of the photographing apparatus can be performed, and if the PMP module 300 is detached from the photographing apparatus, it still can be used as a PMP.

As described above, according to this example embodiment of the present invention, the photographing apparatus combined with the PMP may provide both photographing functions and the PMP functions, which increases user convenience. Additionally, the main parts are shared in common, so any increase in material costs may be minimized. Furthermore, only the PMP module 300 is detached from the photographing apparatus and used as a PMP, and thus portability can be improved. Moreover, the PMP module 300 includes a sub-power source, so the period of time available for the photographing operation can be increased.

In a second example embodiment of the present invention (not shown in the drawings), the main power supply unit 250 of the photographing module 200 and the sub-power supply unit 360 of the PMP module 300 can be combined into a single power supply unit that supplies power to both the photographing module 200 and the PMP module 300.

In a third example embodiment of the present invention (also not shown in the drawings), the display unit 340 can be separate from the photographing module 200 and the PMP module 300 and continue to display image signals from either module without being integrated with either module.

In addition, some of the components or sub-modules of the photographing apparatus can be integrated into single units. In an example embodiment, the image processor 230 and main controller 220 of the photographing module 200 can be integrated into one photographing module controller (not shown in the drawings). In another example embodiment, the display controller 350 and the display unit 340 of the PMP module 300 can be combined into one display unit (also not shown in the drawings). In an alternative example embodiment, the controller 310, signal processor 320 and display controller 350 can be integrated into a PMP module controller (also not shown in the drawings). As such, it is intended that the functional components of the photographing apparatus herein be broadly interpreted as being equivalently performed by a variety of modules and sub-modules.

While there have been illustrated and described what are considered to be example embodiments of the present invention, it will be understood by those skilled in the art and as technology develops that various changes and modifications may be made, and equivalents may be substituted for elements thereof, without departing from the true scope of the present invention. Many modifications, permutations, additions and sub-combinations may be made to adapt the teachings of the present invention to a particular situation without departing from the scope thereof. Accordingly, it is intended, therefore, that the present invention not be limited to the various example embodiments disclosed, but that the present invention includes all embodiments falling within the scope of the appended claims.

What is claimed is:

1. A photographing apparatus comprising:
   a photographing module having
      a capturing unit to convert an optical signal entered through a lens into an image signal to photograph an image,
      a controller to determine whether the image signal is a still image or a moving image, and
      an image processor to process the image signal if the image signal is determined to be a still image; and
   a multimedia module which is detachably mounted with the photographing module, to record and play back the image photographed by the photographing module and to store and play back multimedia content input from an external device, wherein the multimedia module processes the image signal if the image signal is determined to be a moving image.

2. The photographing apparatus of claim 1, wherein the detachable multimedia module is portable.

3. The photographing apparatus of claim 1, wherein the detachable multimedia module is included in a display unit of the photographing apparatus.

4. The photographing apparatus of claim 1, wherein the photographing module comprises:
   a memory to store the image signal compressed by the image processor;
   a main controller to generate a recording command and a playback command of the image; and
   a main power supply unit to supply power to the photographing module.

5. The photographing apparatus of claim 4, wherein the multimedia module comprises: a storage unit to store an image signal corresponding to the moving image transmitted from the image processor of the photographing module, and multimedia content;
   a display unit to display an image corresponding to one of the image signal transmitted from the image processor of the photographing module, and the stored image signal and multimedia content;
a signal processor to compress the image signal transmitted from the image processor to record the compressed signal in the storage unit, and to decode one of the stored image signal and multimedia content to output the decoded one to the display unit;
a controller to control the signal processor according to the recording command and playback command transmitted from the main controller; and
a sub-power supply unit to supply power to the multimedia module.

6. The photographing apparatus of claim 5, wherein the image signal transmitted from the image processor is transmitted to the signal processor according to the ITU-656 standard.

7. The photographing apparatus of claim 5, wherein the main controller communicates with the controller using a serial peripheral interface (SPI).

8. The photographing apparatus of claim 1, wherein the multimedia module is a module to provide portable multimedia player (PMP) functions to record and play back multimedia content.

9. The photographing apparatus of claim 1, wherein the multimedia module provides functions to record and play back the photographed image when the multimedia module is combined with the photographing module; and
the multimedia module provides the PMP functions when the multimedia module is separated from the photographing module.

10. The photographing apparatus of claim 5, wherein the storage unit, display and signal processor of the multimedia module are shared with the photographing module to record and play back the photographed image when the multimedia module is combined with the photographing module.

11. The photographing apparatus of claim 1, wherein the photographing module and the multimedia module are driven by at least one power supply unit.

12. A photographing apparatus comprising:
a photographing module having
a capturing unit to convert an optical signal entered through a lens into an image signal;
a main controller to determine whether the image signal is a still image or a moving image, and
an image processor to process the image signal if the image signal is determined to be a still image;
a multimedia module having
a moving image processor to process the image signal if the image signal is determined to be a moving image;
a storage unit to store an image signal corresponding to the moving image transmitted from the image processor of the photographing module, and multimedia content; and
a display unit to display an image corresponding to one of the image signal obtained from the photographing module, and the multimedia content and the image signal stored in the multimedia module.

13. The photographing apparatus of claim 12, wherein the photographing module comprises:
a memory to store the image signal compressed by the image processor; and
a main power supply unit to supply power to the photographing module, wherein the main controller generates a recording command and a playback command of the image.

14. The photographing apparatus of claim 13, wherein the main controller includes the Image processor.

15. The photographing apparatus of claim 12, wherein the multimedia module comprises:
a controller to control the signal processor according to the recording command and playback command transmitted from the main controller;
a display controller that transfers an input to the controller; and
a sub-power supply unit to supply power to the multimedia module; and
wherein the moving image processor compresses the image signal transmitted from the image processor, records the compressed signal in the storage unit, and decodes one of the stored image signal and multimedia content to output the decoded one to the display unit.

16. The photographing apparatus of claim 15, wherein the display unit incorporates the display controller.

17. The photographing apparatus of claim 15, wherein the controller incorporates the moving image processor and the display controller.

18. The photographing apparatus of claim 15, wherein the photographing module and the multimedia module are driven by a single power supply unit.

19. The photographing apparatus of claim 12, wherein the multimedia module provides functions to record and play back the photographed image when the multimedia module is combined with the photographing module, and
the multimedia module provides the PMP functions when the multimedia module is separated from the photographing module.

20. The photographing apparatus of claim 15, wherein the image signal transmitted from the image processor is transmitted to the moving image processor according to the iTU-656 standard.

21. A photographing module detachably coupled with a multimedia module, the photographing module comprising:
a capturing unit to capture an image signal corresponding to a still image or a moving image;
a controller to determine whether the image signal is a still image or a moving image; and
an image processor to process the image signal if the image signal is determined to be a still image and the multimedia module to process the image signal if the image signal is determined to be a moving image.

22. A method of controlling an image processor of a photographing module detachably coupled with a multimedia module, the method comprising:
receiving an image signal;
controlling the image processor to determine whether the image signal corresponds to a still image or a moving image;
controlling the image processor to compress the image signal when the image signal corresponds to the still image; and
controlling the image processor to transmit the image signal to the multimedia module when the image signal corresponds to the moving image.

* * * * *